US011075960B2

(12) United States Patent
Harry et al.

(10) Patent No.: US 11,075,960 B2
(45) Date of Patent: Jul. 27, 2021

(54) USER OF IDENTITY SERVICES TO AUTO-DISCOVER SUBSCRIBERS OF SOCIAL NETWORKING SITES (71) Applicant: Apple Inc., Cupertino, CA (US)

(72) Inventors: Ben Harry, Cupertino, CA (US); Alan Berfield, San Jose, CA (US); Johnny Trenh, Los Gatos, CA (US); Megan Gardner, Redwood City, CA (US)

(73) Assignee: Apple Inc., Cupertino, CA (US)

( * ) Notice: Subject to any disclaimer, the term of this patent is extended or adjusted under 35 U.S.C. 154(b) by 791 days.

(21) Appl. No.: 15/612,794

(22) Filed: Jun. 2, 2017

(65) Prior Publication Data
US 2017/0359389 A1 Dec. 14, 2017

Related U.S. Application Data (60) Provisional application No. 62/348,747, filed on Jun. 10, 2016.

(51) Int. Cl.
G06F 15/173 (2006.01)
H04L 29/06 (2006.01)
A63F 13/795 (2014.01)
A63F 13/35 (2014.01)
H04L 29/08 (2006.01)
A63F 13/85 (2014.01)

(52) U.S. Cl.
CPC .......... H04L 65/1069 (2013.01); A63F 13/35 (2014.09); A63F 13/795 (2014.09); A63F 13/85 (2014.09); H04L 67/141 (2013.01); A63F 2300/5566 (2013.01)

(58) Field of Classification Search
CPC .... H04L 65/1069; H04L 67/141; A63F 13/35; A63F 13/795; A63F 13/85
See application file for complete search history.

(56) References Cited

U.S. PATENT DOCUMENTS

| 10,112,110 | B1* | 10/2018 | Garavito | A63F 13/35 |
| 2004/0116186 | A1* | 6/2004 | Shim | A63F 13/79 463/42 |
| 2008/0194331 | A1* | 8/2008 | Caffrey | A63F 13/48 463/42 |

(Continued)

Primary Examiner — Thanh T Nguyen
(74) Attorney, Agent, or Firm — BakerHostetler (57) ABSTRACT Techniques are disclosed for initiating game sessions between subscribers to online gaming services when account IDs of those subscribers are unknown. Such techniques permit a first user to select a second user with whom to play a game from information readily at hand, such as a contact manager that the first user maintains. The first user's device may send a resolution request message to an identity services server that includes contact information of the second user. Contact information may include network-based information regarding the second user, such as the user's e-mail address or phone number. The identity services server may resolve the contact into an account ID. Thereafter, a game launch request may be sent to the game server, which includes the account identifier resolved by the identity services server. An invitation message may be sent to a terminal of the second user to participate in the game and the game may be started. These techniques do not require that the first user possess the second user's account ID at the game server.

40 Claims, 6 Drawing Sheets (56) References Cited

U.S. PATENT DOCUMENTS

2016/0093169 A1\* 3/2016 Orcutt ................. G07F 17/3225
          463/13
2019/0158484 A1\* 5/2019 Grunewald ............. A63F 13/73

\* cited by examiner

USER OF IDENTITY SERVICES TO AUTO-DISCOVER SUBSCRIBERS OF SOCIAL NETWORKING SITES

CROSS REFERENCE TO RELATED APPLICATIONS

This application benefits from priority of application Ser. No. 62/348,747, filed Jun. 10, 2016 and entitled "User of Identity Services to Auto-Discover Subscribers of Social Networking Sites," the disclosure of which is incorporated herein in its entirety.

BACKGROUND

The present disclosure relates to protocols for associating subscribers of social networking services when those services' subscribers, according to account identifiers, may not be known to all subscribers.

Modern consumer computing systems provide their users with a wide variety of different networking services, such as online gaming and social networking sites. Oftentimes, the networking services require subscribers to enroll with the service and, in so doing, select account identifiers that are unique to each subscriber. Account identifiers are not always intuitive, either to the subscriber that selects them or to other subscribers that desire to interact with the selecting subscriber. Moreover, such networking services may require subscribers to develop associations with each other, whether they are through "friend requests," "connection requests" or other invitation-based protocols, before the subscribers can interact with each other in the service. Thus, the process by which individual subscribers identify their social contacts on different networking sites, then associate with them, can be burdensome.

The present disclosure proposes techniques to overcome the burden associated with discovering subscribers on networking sites.

DETAILED DESCRIPTION

Embodiments of the present disclosure provide techniques for initiating game sessions between subscribers to online gaming services when account IDs of those subscribers are unknown. Such techniques permit a first user to select a second user with whom to play a game. Responsive to the selection of the second user, a resolution request may be sent to an identity server that includes contact information of the selected user. A response to the resolution request from the identify server may be received that includes an account identifier associated with the selected user. The account identifier may represent an account stored by a game server. A game launch request may be sent to the game server. The game launch request may include the account identifier. These techniques do not require that the first user have direct access to the second user's account ID at the game server.

As used herein, a "user" may be considered broadly as any person associated with any system, device, or other component described herein, regardless of whether the person is directly interacting with the system, device, or other component at any given time.

Figure 1:
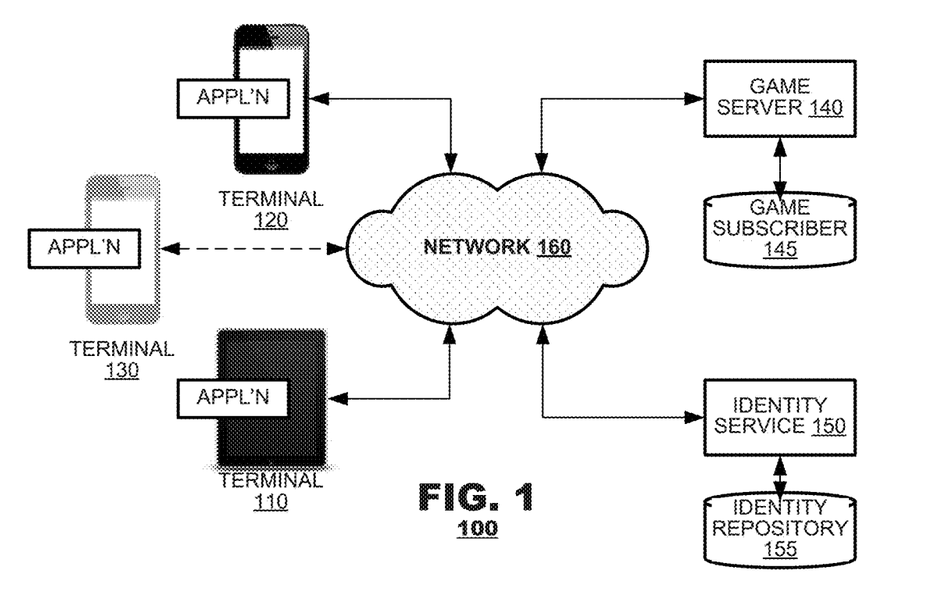
FIG. 1 illustrates a system according to an embodiment of the present disclosure.

FIG. 1 illustrates a system 100 according to an embodiment of the present disclosure. The system may include a plurality of terminals 110-130, a game server 140 and an identity services server 150 provided in mutual connection by a network 160. The terminals 110-130 and game server 140 may collaborate to run online games for users (not shown) at the terminals 110-130. The game server 140 may include a database 145 of subscribers to its games, which typically include authentication data for the subscribers such as account IDs, passwords and the like that were created when users registered for gaming services of the game server 140. The identity services server 150 may include its own identity repository 155 (e.g., a database) of identities, which may relate users to publically-available information of the subscribers (for example, telephone numbers and e-mail addresses).

In many implementations, the game server 140 may host game sessions and the terminals 110-130 may execute applications with terminal-specific elements of those sessions; for example, each terminal 110, 120, 130 may execute applications that display to their respective users that user's game experience and accept game input from the users to guide further gameplay. Other implementations find application with the present disclosure, however, including implementations that cause game sessions to be hosted by one or more of the terminals 110-130 themselves. The architecture of gameplay is immaterial to the present discussion. It is sufficient to note that the game server 140 governs admission of terminals to individual instances of the games.

In an embodiment, the game server 140 may be represented by an online multiplayer social gaming network such as the Apple Game Center service. Such gaming networks typically allow their subscribers to invite other subscribers to play a supported game, start a multiplayer game with subscribers, and track their performance through the games. Individual users typically become members of the network and become linked to other users through a connection protocol involving invitations and acceptances. Thus, as originally conceived, subscribers would enter games with other subscribers with whom they had already become linked; they would not enter into games with other users with whom they were not linked. According to the present disclosure, however, users of such gaming networks may establish game sessions with other users through an identity services server 150.

The identity services server 150 may represent one or more computing devices providing identity services. In particular, the identity services server 150 may maintain the identity repository 155 of the users. An identity may be associated with a user of one of the terminals 110, 120, 130 and may be used by a variety of network components (e.g., the game server 140 and the terminals 120, 130) to identify a user and/or an associated terminal 110 of a user. An identity may include a number of attributes relating to a user and/or its associated terminal 110 and, in fact, may associate attributes of a variety of terminals with a single user. An attribute of an identity may include a unique identifier, such as an account ID, a user number, an email address, or a phone number (e.g., a phone number associated with the user's terminal 110, 120, 130). The identity repository 155 may store several account IDs for individual users, each related to an account at a respective game server 140 (other servers not shown). An attribute also may relate to personal information about the user, such as the user's name or nickname/alias. An attribute may further relate to the terminal 110, 120, 130 associated with the user, including an IP (internet protocol) address, a MAC (media access control) address, a phone number, or other information that may be used to identify and/or connect to the terminal 110, 120, 130. Such attributes may additionally reflect various characteristics of the terminal 110, 120, 130, such as device type, hardware characteristics, operating system, connection capabilities (e.g., whether the terminal 110, 120, 130 is configured to establish a Bluetooth® connection), and applications (e.g., a particular multiplayer gaming application) installed on the terminal 110, 120, 130. An identity may also include an authentication attribute, such as a text password, a biometric profile, or a gesture password. It will be appreciated that any of the aforementioned attributes may function as a unique identifier of an identity so long as said attribute is unique among the identities in the identity repository 155.

In operation, a network component (e.g., a terminal 110) may transmit contact data to the identity services server 150, whereupon the identity services server 150 receives the contact data. Upon receipt of the contact data, the identity services server 150 may cross-reference the contact data with the identities of the identity repository 155 and determine the identity corresponding to the contact data. Accordingly, one or more attributes of the identity may be transmitted back to the requesting network component. Any network component, whether they are individual terminals 110, 120, 130 or the game server 140, may communicate with the identity services server 150 to resolve identities in this fashion.

In some aspects, for example where a user transmits his or her contact data, the user's terminal 110 may transmit an authentication attribute with or following the unique identifier. The provided authentication attribute may be checked by the identity services server 150 against the stored authentication attribute associated with the identity to ensure that the user has provided his or her correct authentication attribute. Upon this authentication, the user's identity, and attributes thereof, may be used in various functionalities of the user's terminal 110 such as to identify the user in a multiplayer gaming application executing on the user's terminal 110.

In other aspects, for example where a user transmits another user's contact data, the requesting terminal 110 need not transmit an authentication attribute in concert with the unique identifier. In such an instance, the identity services server 150 may return back only a limited subset of the attributes of the identity corresponding to that contact data. As an example, a first user, via the first terminal 110, may transmit contact data for the identity of a second user to the identity services server 150. Based on the transmitted contact data, the identity services server 150 may determine the identity of the second user and return one or more attributes of the second user's identity to the first terminal 110, such as an account ID. The attributes of the second user's identity may be used by the first terminal 110 (e.g., by the multiplayer gaming application executing on the first terminal 110) to facilitate multiplayer gameplay with the second user. In addition to the account ID, the attributes of the second user's identity may include an attribute (e.g., an IP address, MAC address, or other terminal identifier) usable to effectuate connection with the second terminal 120 used by the second user. Accordingly, the instance of the multiplayer gaming application executing on the first terminal 110 may connect to and establish a multiplayer game session with the instance of the multiplayer gaming application executing on the second terminal 120.

Figure 2:
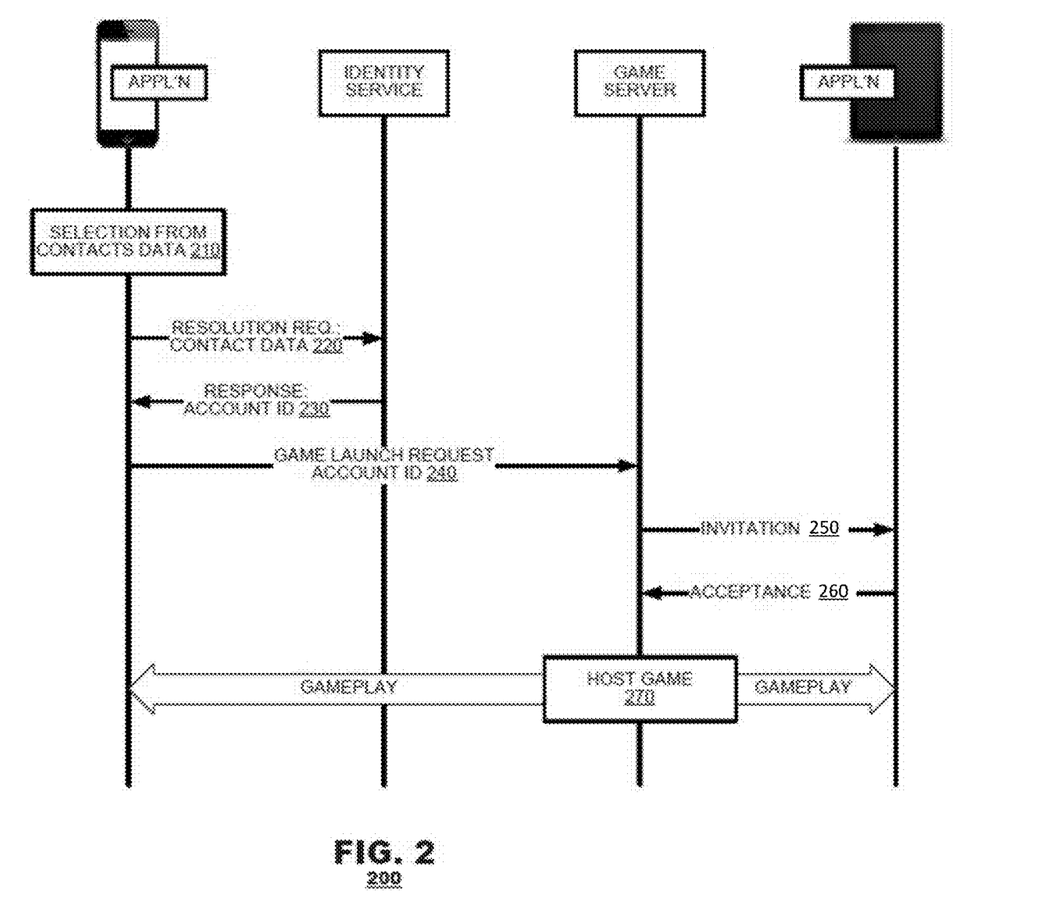
FIG. 2 illustrates a communication flow for initiating gameplay according to an embodiment of the present disclosure.

FIG. 2 illustrates a communication flow 200 for initiating gameplay according to an embodiment of the present disclosure. According to the communication flow 200, a user at a first application may identify other user(s) with which to play a game by making selection(s) from among contacts data stored by the user at a first terminal (box 210). The first terminal may issue a resolution request to an identity service, providing contact data of the selected contact(s) (msg. 220). The identity service may search its stores using the provided contact data for identities of other users of the identity service and send a response message providing account IDs that match to the provided contact data (msg. 230). Thereafter, the first terminal may send a game launch request to the game server (msg. 240) that includes account IDs of the contacts selected in box 210. The game server may send invitation messages (msg. 250) to terminals of the selected contacts and, if the invitations are accepted (msg. 260), the game server may host the game (box 270). Thereafter, gameplay may proceed as dictated by the game.

The game initiation techniques illustrated in FIG. 2 does not require users to become linked to each other prior to initiation of the game. In the illustrated embodiment, the game server may be configured to issue invitations in response to a game launch request that includes the account IDs of other user(s) who are to be invited to a game. In this manner, when a first user's terminal provides an account ID of another user who is to be included in the game, it impliedly signifies that that two users are socially linked with each other via a mechanism outside the domain of the game server.

In one embodiment, a first terminal may store the account ID(s) of the selected user(s) locally in association with its contacts data. It is unnecessary to do so, however, or for the terminal to display the account ID of the selected user(s) to a user. In fact, in some embodiments, it may be advantageous not to publish the account ID(s) of the selected user(s) at the first terminal. Doing so may provide a level of privacy to the selected user(s) if, for example, they decline to participate in games with the user of the first terminal.

Figure 3:
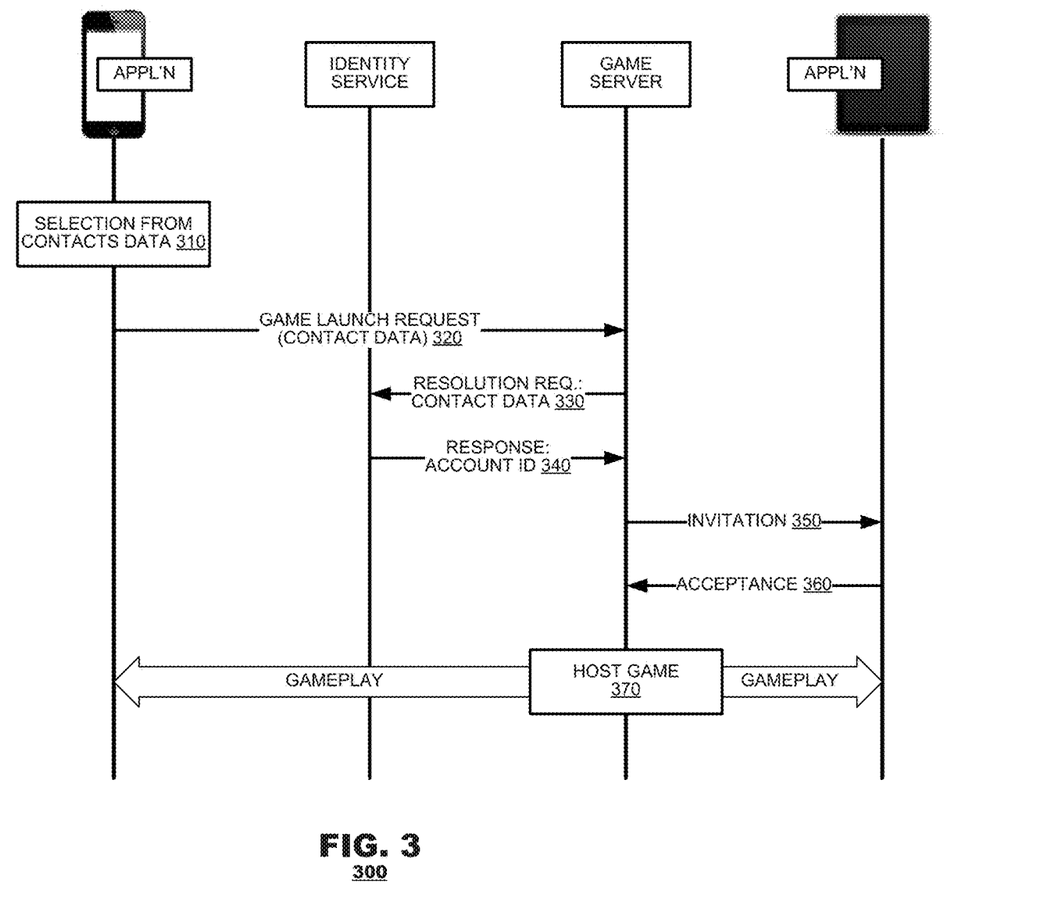
FIG. 3 illustrates another communication flow for initiating gameplay according to another embodiment of the present disclosure.

FIG. 3 illustrates another communication flow 300 for initiating gameplay according to an embodiment of the present disclosure. According to the communication flow 300, a user at a first application may identify other user(s) with which to play a game by making selection(s) from among contacts data stored by the user at a first terminal (box 310). The first terminal may send a game launch request to the game server (msg. 320) that includes contact data of the contacts selected in box 310. The game server may issue a resolution request to an identity service, providing contact data of the selected contact(s) (msg. 330). The identity service may search its stores using the provided contact data for identities of other users of the identity service and send a response message providing account IDs that match to the provided contact data (msg. 340). The game server may send invitation messages (msg. 350) to terminals of the selected contacts and, if the invitations are accepted (msg. 360), the game server may host the game (box 370). Thereafter, gameplay may proceed as dictated by the game.

The game initiation techniques illustrated in FIG. 3 also do not require users to become linked to each other prior to initiation of the game. In the illustrated embodiment, the game server may be configured to issue resolution requests in response to a game launch request that includes contact data of other user(s) who are to be invited to a game. In this manner, when a first user's terminal provides contact data of another user who is to be included in the game, it impliedly signifies that that two users are socially linked with each other via a mechanism outside the domain of the game server.

In the embodiment illustrated in FIG. 3, resolution requests and responses are exchanged between the identity services server and the game server, rather than between the identity services server and user terminals as in FIG. 2. In this protocol, the account IDs of the user(s) selected for inclusion in a game are not presented to the first terminal. Keeping exchange of account IDs between the identity services server and the game server can provide a level of privacy protection to users whose identities are being resolved if, for example, they decline to participate in games with the user of the first terminal.

Figure 4:
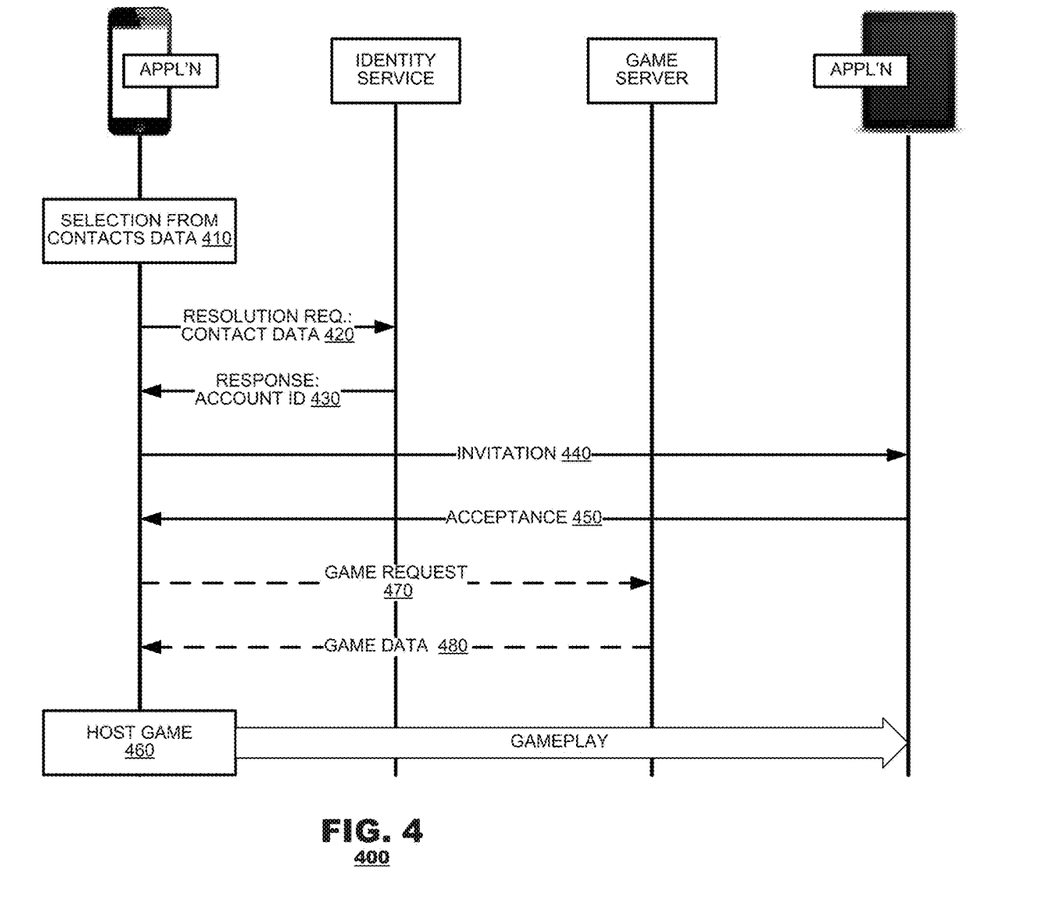
FIG. 4 illustrates a communication flow for initiating gameplay according to a further embodiment of the present disclosure.

FIG. 4 illustrates a communication flow 400 for initiating gameplay according to an embodiment of the present disclosure. According the communication flow, a user at a first application may identify other user(s) to play a game by making selection(s) from among contacts data stored by the user at a first terminal (box 410). The first terminal may issue a resolution request to an identity service, providing contact data of the selected contact(s) (msg. 420). The identity service may search its stores using the provided contact data for identities of other users of the identity service and send a response message providing account IDs that match to the provided contact data (msg. 430). The first terminal may send an invitation message (msg. 440) to a terminal of the other user, which if accepted (msg. 450) may initiate the game.

In the embodiment illustrated in FIG. 4, the first terminal may host the game (box 460). This may involve the first terminal requesting data for the game (msg. 470) which may be provided to the game server (msg. 480). The requests and replies illustrated in messages 470 and 480, however, may be omitted in cases, for example, where the first terminal already stores application data and other programming that is necessary to host the game. Thereafter, gameplay may proceed as dictated by the game.

The game initiation techniques illustrated in FIG. 4 also do not require users to become linked to each other prior to initiation of the game. In the illustrated embodiment, the game server may be configured to issue invitations in response to a game launch request that includes the account IDs of other user(s) who are to be invited to a game. In this manner, when a first user's terminal provides an account ID of another user who is to be included in the game, it impliedly signifies that that two users are socially linked with each other via a mechanism outside the domain of the game server.

Figure 5:
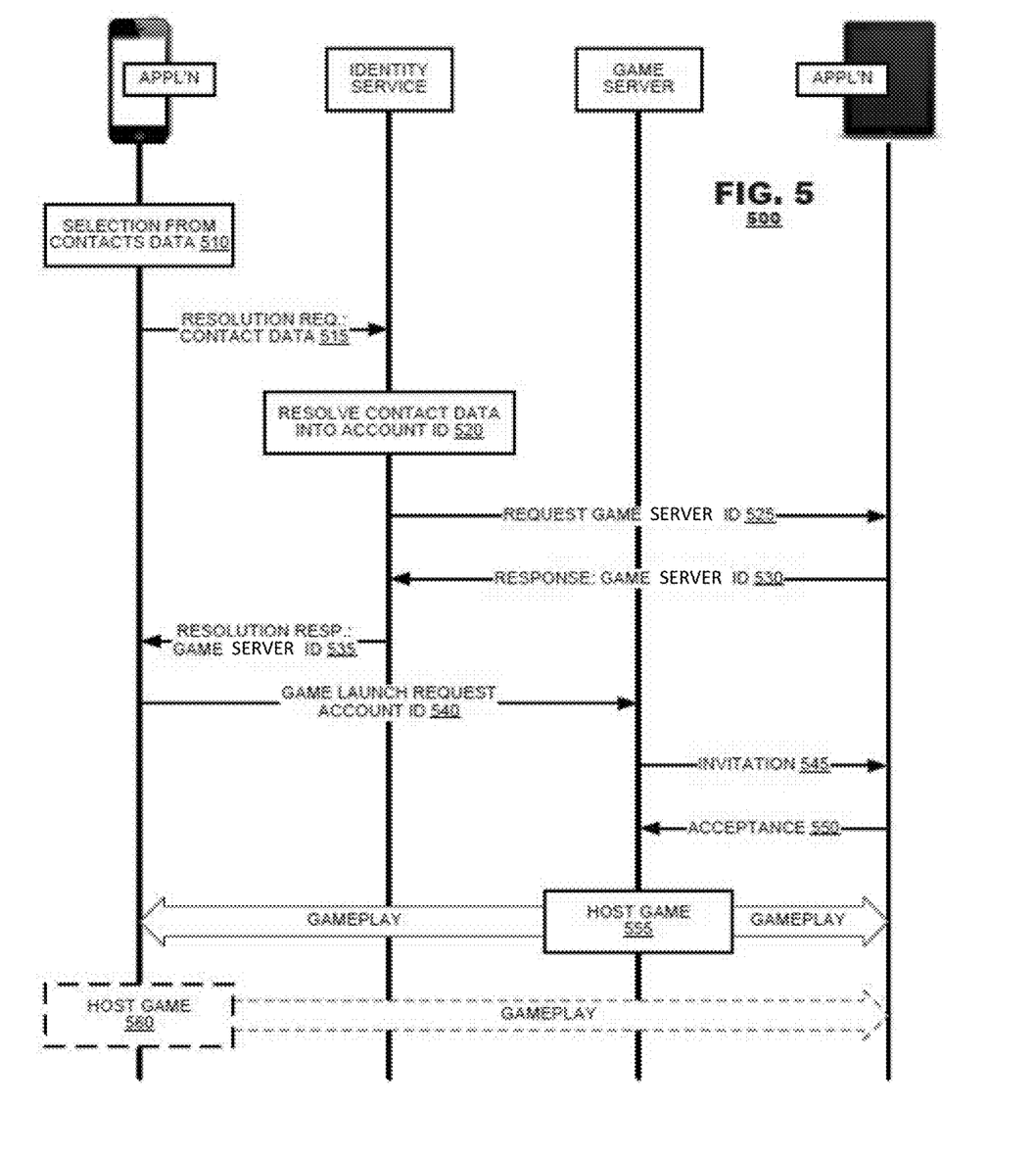
FIG. 5 illustrates another communication flow for initiating gameplay according to another embodiment of the present disclosure.

FIG. 5 illustrates a communication flow 500 for initiating gameplay according to an embodiment of the present disclosure. According to the communication flow 500, a user at a first application may identify other user(s) with which to play a game by making selection(s) from among contacts data stored by the user at a first terminal (box 510). The first terminal may issue a resolution request to an identity service, providing contact data of the selected contact(s) (msg. 515). The identity service may search its stores using the provided contact data for identities of other users of the identity service (box 520). The identity service server may send a message to a terminal of the second user, using the second user's account information at the identity service server, that requests the second user's ID at the game server (msg. 525). Assuming the second user agrees to provide the requested information, the second user's terminal may send a response message to the identity service server that provides the game server ID (msg. 530). The identity service server may send a resolution response message to the first user's terminal that provides the game server ID (box 535).

Thereafter, the first user's terminal may send a game launch request to the game server that provides the account ID of the second user (msg. 540). The game server may authenticate the first and second users and initiate the game according to its protocols. For example, the game server may send an invitation message (msg. 545) to the second user's terminal and, in response to an acceptance message therefrom (msg. 550), the game server may host the game (box 555). Alternatively, another terminal may host the game as shown in box 560.

The game initiation techniques illustrated in FIG. 5 do not require an identity services server to store users' identifiers at game servers in order to have them linked. However, if desired, the identity service servers may store users' game server IDs as they receive response messages such as message 530. In this manner, the identity services server may accumulate data of its users, which permits it to avoid sending repeated request messages 525 in further iterations of game play. Typically, the identity services server may operate according to privacy control settings, which may be entered by users of the identity services server's services and which may dictate to the identity services server whether or not to store such information about users.

Additionally, a first terminal may store the account ID(s) of the selected user(s) locally in association with its contacts data. It is unnecessary to do so, however, or for the terminal to display the account ID of the selected user(s) to a user. In fact, in some embodiments, it may be advantageous not to publish the account ID(s) of the selected user(s) at the first terminal. Doing so may provide a level of privacy to the selected user(s) if, for example, they decline to participate in games with the user of the first terminal.

Figure 6:
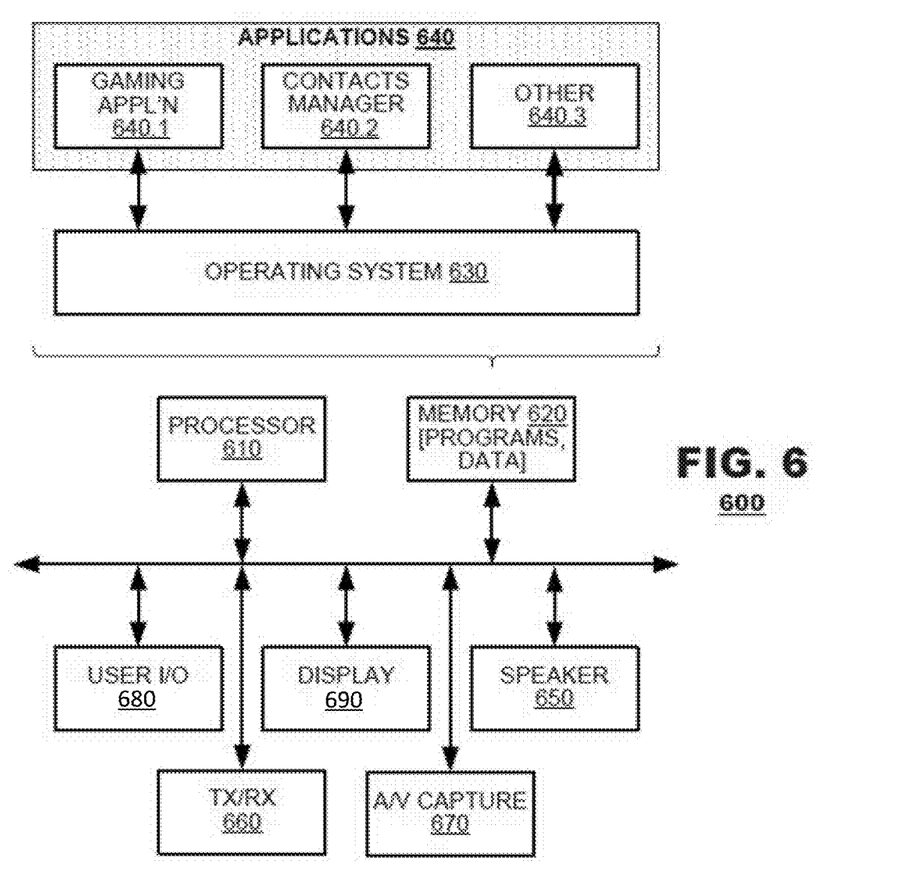
FIG. 6 is a block diagram of a terminal according to an embodiment of the present disclosure.

FIG. 6 is a block diagram of a terminal 600 according to an embodiment of the present disclosure. The terminal 600 may include a processor 610 and a memory 620. The memory 620 may store program instructions that define an operating system 630 and various applications 640 that are executed by the processor 610. For example, the applications 640 may include a gaming application 640.1 and a contacts manager 640.2. The memory 620 also may store application data for each of the applications 640.1, 640.2, 640.3. In the case of the contacts manager 640.2, the memory 620 may store the e-mail addresses, phone numbers and other contact data that identifies users of other devices with whom a user of the terminal 600 may desire to play a game. The terminal 600 may execute still other applications 640.3 that have access to contact data of other users. In some cases, the contact data need not be stored on the terminal 600 itself. For example, the terminal 600 may execute a social networking application that links a user of the terminal 600 to other members of the social networking service. The social networking application may retrieve contact data of other users from an Internet source (not shown) rather than store the data locally on the terminal 600. The principles of the present disclosure may use contact information of other users in the signaling protocols illustrated in FIGS. 2-5.

FIG. 6 also illustrates other components that may be common to terminals 600 that execute games. Such components may include user input/output devices 680 through which users may enter commands to the terminal 600 and affect gameplay, a display device 690 through which the terminal may render graphics output of the game, a speaker system 650 through which the terminal 600 may render audio output of the game, a transceiver system 660 through which the terminal 600 may communicate with wireless and/or wireline networks that provide communication connectivity to game servers, identity services servers and other terminals, and an audio-visual capture system 670 that may capture audio and/or video of an operator of the terminal 600.

The terminal 600 may communicate with other system components, for example, other terminals, the game server and the identity services server, via a communication channel. The transceiver system 660 may communicate with a wide variety of wired or wireless electronic communications networks, such as, e.g., a wired/wireless local area network (LAN), a wired/wireless personal area network (PAN), a wired/wireless home area network (HAN), a wired/wireless wide area network (WAN), a campus network, a metropolitan network, an enterprise private network, a virtual private network (VPN), an internetwork, a backbone network (BBN), a global area network (GAN), the Internet, an intranet, an extranet, an overlay network, Near field communication (NFC), a cellular telephone network, a Personal Communications Service (PCS), using known protocols such as the Global System for Mobile Communications (GSM), CDMA (Code-Division Multiple Access), GSM/EDGE and UMTS/HSPA network technologies, Long Term Evolution (LTE), 6G (5th generation mobile networks or 6th generation wireless systems), WiMAX, HSPA+, W-CDMA (Wideband Code-Division Multiple Access), CDMA2000 (also known as C2K or IMT Multi-Carrier (IMT-MC)), Wireless Fidelity (Wi-Fi), Bluetooth, AirDrop, and/or the like, and/or a combination of two or more thereof. The NFC standards cover communications protocols and data exchange formats, and are based on existing radio-frequency identification (RFID) standards including ISO/IEC 14443 and FeliCa. The standards include ISO/IEC 18092[3] and those defined by the NFC Forum.

The foregoing discussion has described operation of the foregoing embodiments in the context of terminals and servers. Commonly, these terminals are provided as electronic devices such as personal computers, notebook computers, mobile computing platforms such as smartphones and tablet computers, dedicated gaming systems, portable media players, computer servers, and the like. As described, they may execute programs that are stored in memory of those devices and be executed by processors within them. Alternatively, they can be embodied in dedicated hardware components such as application specific integrated circuits, field programmable gate arrays and/or digital signal processors. And, of course, these components may be provided as hybrid systems that distribute functionality across dedicated hardware components and programmed general purpose processors, as desired.

Several embodiments of the disclosure are specifically illustrated and/or described herein. However, it will be appreciated that modifications and variations of the disclosure are covered by the above teachings and within the purview of the appended claims without departing from the spirit and intended scope of the disclosure.

We claim:

1. A method of initiating an online game, the method comprising:
    displaying a user interface with candidate players;
    receiving, from a user, a selection of a player from the candidate players;
    responsive to the user selection of the player with whom to play a game, sending, to an identity server, a request to resolve contact information identifying the selected player into an account identifier;
    receiving a response to the request from the identity server that includes the account identifier associated with the selected person, the account identifier representing an account stored by a game server; and
    sending a game launch request to the game server to play a game with the user and the player, the game launch request including the account identifier.

2. The method of claim 1, further comprising:
    sending an invitation message to a terminal of the selected person to participate in the game.

3. The method of claim 2, further comprising:
    when an acceptance message is received in response to the invitation message, launching the game between the terminal of the selected person and a terminal at which the selection was made.

4. The method of claim 2, wherein the invitation message is sent from a terminal of the person that made the selection to the terminal of the selected person.

5. The method of claim 2, wherein the invitation message is sent from the game server to the terminal of the selected person.

6. The method of claim 1, wherein the game is hosted by the game server.

7. The method of claim 1, further comprising hosting the game by one of a terminal of the selected person and a terminal of a person who made the selection.

8. The method of claim 1, wherein the resolution request message is sent from a terminal of a person who made the selection.

9. The method of claim 1, wherein the resolution request message is sent from the game server.

10. The method of claim 1, wherein the contact information of the selected player is stored locally by a terminal of the user who made the selection.

11. The method of claim 1, wherein the contact information is stored by a social networking account associated with a person who made the selection.

12. A method of initiating an online game, the method comprising:
    responsive to a user selection of a person with whom to play a game, receiving a game launch request message by a game server that includes contact information identifying the selected person;
    sending a request, to an identity server, to resolve the contact information into an account identifier of the selected person; and
    receiving a response to the resolution request message from the identity server that includes an account identifier associated with the selected person, the account identifier representing an account stored by the game server.

13. The method of claim 12, further comprising:
    sending an invitation message to a terminal of the selected person to participate in the game.

14. The method of claim 13, further comprising:
when an acceptance message is received in response to the invitation message, launching the game between the terminal of the selected person and a terminal of a person who made the selection of the selected person.

15. The method of claim 12, wherein the game is hosted by the game server.

16. The method of claim 12, further comprising hosting the game by a terminal of one of the selected person or the person who made the selection.

17. The method of claim 12, wherein the contact information is stored locally by a terminal of a person who made the selection.

18. The method of claim 12, wherein the contact information is stored by a social networking service of a person who made the selection.

19. A method of initiating an online game, the method comprising:
receiving, from a first terminal, a resolution request message that includes contact information identifying a person, selected by a user of the first terminal to play a game with;
searching local stores to identify a user account associated with the received contact information identifying the selected person;
communicating with a second terminal associated with the user account, requesting account data of a service associated with the game; and
upon receipt of the requested account data from the second terminal, forwarding a response to the resolution request message that provides the requested account data.

20. The method of claim 19, further comprising storing the requested account data in the local stores.

21. A memory system storing program instructions that, when executed by a processing device, cause the processing device to:
responsive to a user selection of a person with whom to play a game, send a resolution request message to an identity server that includes contact information identifying the selected person;
receive a response to the resolution request message from the identity server that includes an account identifier associated with the selected person, the account identifier representing an account stored by a game server; and
send a game launch request message to the game server, the game launch request message including the account identifier.

22. The memory system of claim 21, wherein the program instructions further cause the processing device to:
send an invitation message to a terminal of the selected person to participate in the game.

23. The memory system of claim 22, wherein the program instructions further cause the processing device to:
when an acceptance message is received in response to the invitation message, participate in the game with the terminal of the selected person.

24. The memory system of claim 21, wherein the game is hosted by the game server.

25. The memory system of claim 21, wherein the program instructions cause the processing device to host the game.

26. The memory system of claim 21, wherein the contact information is stored by the memory system.

27. The memory system of claim 21, wherein the program instructions cause the processing device to download the contact information from an online social networking service.

28. A terminal, comprising:
a processing device, a transceiver, and a memory system in mutual communication, wherein:
the transceiver supports communication between the terminal and an identity server and between the terminal and a game server, and
the memory system stores program instructions that, when executed by processing device, cause the processing device to:
displaying a user interface with candidate players;
receiving, from a user, a selection of a player from the candidate players;
responsive to the user selection of the player with whom to play a game, sending, to an identity server, a request to resolve contact information identifying the selected player into an account identifier;
receiving a response to the request from the identity server that includes the account identifier associated with the selected person, the account identifier representing an account stored by a game server; and
sending a game launch request to the game server to play a game with the user and the player, the game launch request including the account identifier.

29. The terminal of claim 28, wherein the program instructions further cause the processing device to:
send, via the transceiver, an invitation message to a terminal of the selected person to participate in the game.

30. The terminal of claim 29, wherein the program instructions further cause the processing device to:
when an acceptance message is received in response to the invitation message, participate in the game with the terminal of the selected person.

31. A computing device, comprising:
a processing device, a transceiver, and a memory system in mutual communication, wherein:
the transceiver supports communication between the computing device and an identity server and between the computing device and a terminal, and
the memory system stores program instructions that, when executed by the processing device, cause the processing device to:
receive, via the transceiver, a game launch request from the terminal, the game launch request including contact information specifying a person, selected by a user, with whom to play a game;
responsive to receiving the game launch request, send, via the transceiver, a resolution request message to the identity server that includes the contact information of the selected person;
receive, via the transceiver, a response to the resolution request message from the identity server that includes an account identifier associated with the selected person, the account identifier representing an account associated with the game; and
initiate, based on the account identifier, the game with a terminal of the selected person.

32. The computing device of claim 31, wherein the program instructions further cause the processing device to:
send, via the transceiver, an invitation message to the terminal of the selected person to participate in the game.

33. The computing device of claim 32, wherein the game is initiated responsive to receiving an acceptance message in response to the invitation message.

34. The method of claim 1, wherein the identity server stores the account identifier associated with the contact information of the selected person.

35. The method of claim 1, wherein the contact information comprises one or more attributes that correspond to identify of the selected person.

36. The method of claim 35, wherein the one or more attributes comprise an account identifier, a user number, an email address, a phone number, or other publicly available personal information.

37. The method of claim 35, wherein the one or more attributes are authentication attributes, comprising a text password, a biometric profile, or a gesture password.

38. The method of claim 1, wherein the contact information comprises one or more attributes that correspond to one or more terminals, associated with the selected person.

39. The method of claim 38, wherein the one or more attributes comprise information used to connect to the one or more terminals.

40. The method of claim 1, further comprising:
sending the identity server contact information of the user, including an authentication attribute of the user and an account identifier of the user, to be used by the identity server for identifying the user when responding to resolution request messages received from other users.

* * * * *